Patented Mar. 5, 1940

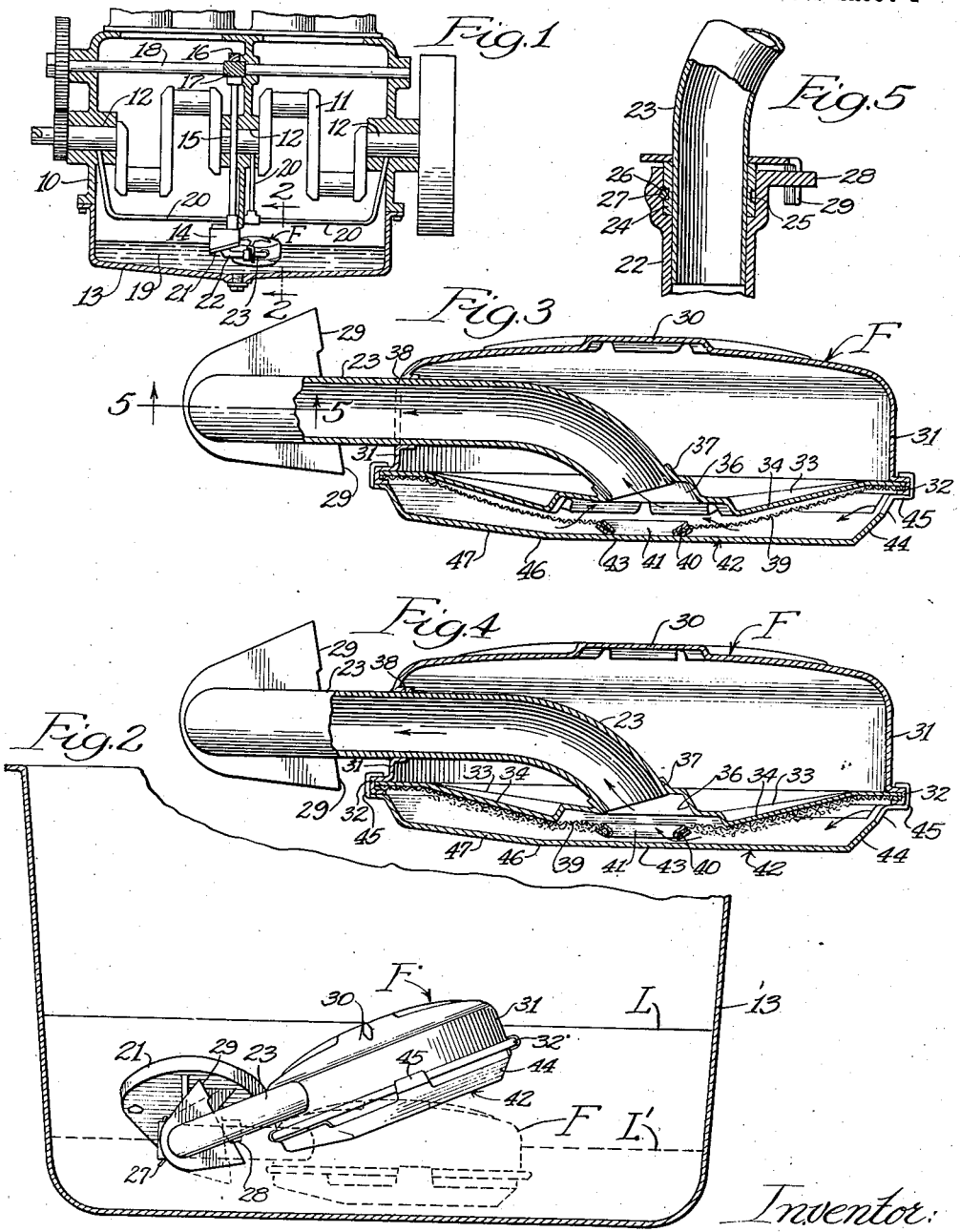

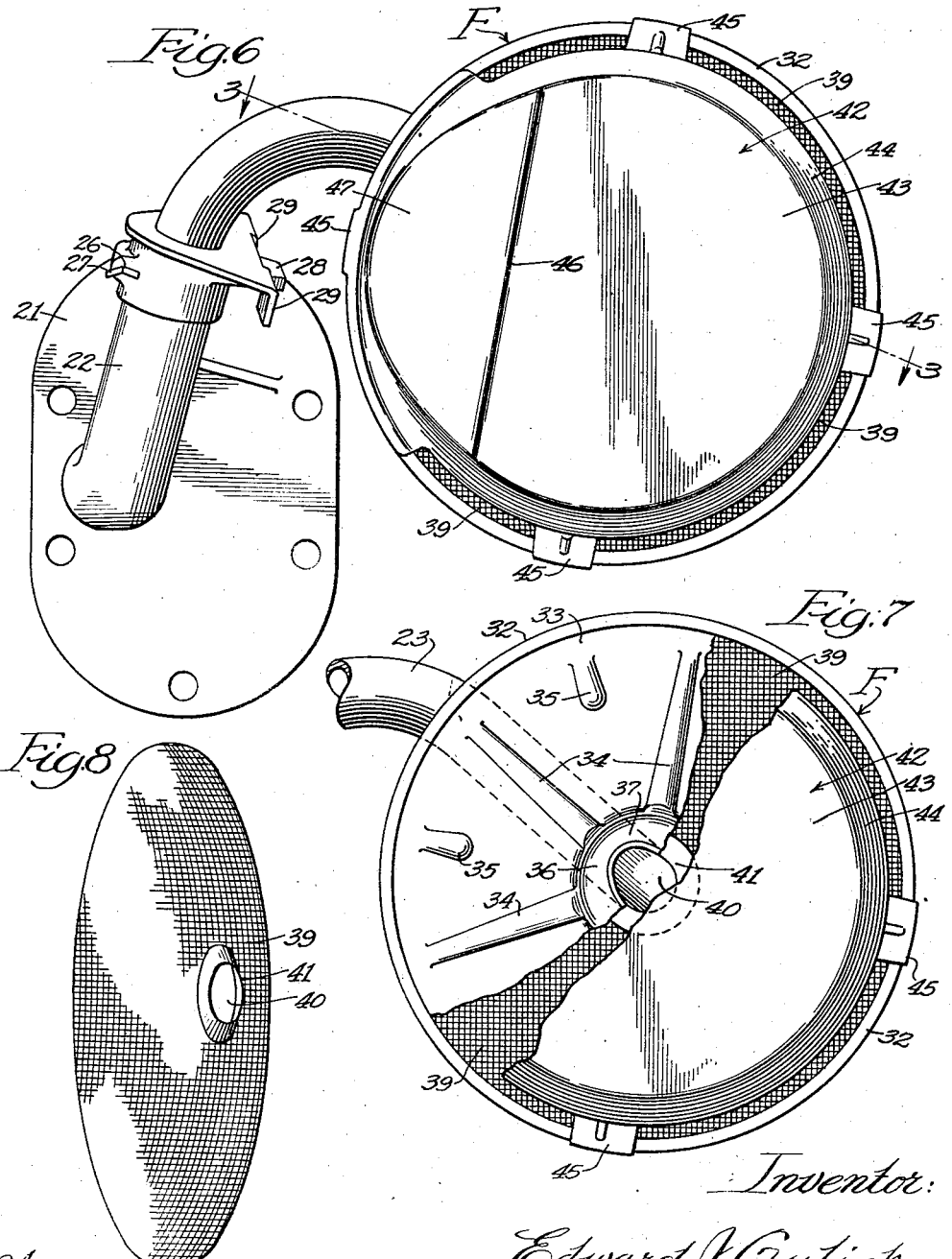

2,192,438

UNITED STATES PATENT OFFICE 2,192,438

ENGINE LUBRICATING DEVICE

Edward J. Gulick, Elkhart, Ind.

Application September 30, 1937, Serial No. 166,462

6 Claims. (Cl. 123—196)

This invention relates to a class of engine lubricating devices designed more especially for use on internal combustion engines wherein lubricating oil is pumped from an oil pan at the bottom of the engine crank case to the crank shaft and other bearings, and wherein the intake end of the pump inlet pipe is buoyantly supported by a float at a point slightly below the top of the body of oil in the pan so as to exclude from the intake impurities such as dirt, water, gasoline, carbon and other deleterious substances which settle and collect in the bottom of the pan. Typical examples of such devices are disclosed in my former Patents No. 1,369,239, Feb. 22, 1921, and No. 1,890,984, Dec. 13, 1932. In the latter patent I disclose the use of a wire screen on the bottom of the float covering the intake of the pump inlet pipe on which the float is mounted, so as to screen out such impurities as may rise to the upper portion of the oil body under the pump suction and the jolting and vibration to which the oil body is subjected in automobile service. But it has been found in practice that, unless the screen is frequently cleaned, it may become so badly clogged as to wholly or partly stop the flow of oil to the pump, resulting in starving the latter and injuring the bearings through lack of adequate lubrication.

An important object of my present improvement is to provide an improved device of the same character as that of my aforesaid Patent No. 1,890,984, whereby such starvation of the oil pump, if the screen becomes clogged, cannot occur, but an oil by-pass is automatically opened by the pump suction to prevent the injury of dry bearings, and whereby, so long as the screen is functioning properly, the by-pass is automatically maintained closed.

In my Patent No. 1,890,984, I have disclosed in association with the oil pan and float a device that I term an oil flow control or baffle plate, the chief function of which is to cause the oil to flow in a substantially horizontal direction from the top portion of the oil body through the screen and to the inlet orifice of the oil suction pipe. In one form of this device as shown in the said patent the control or baffle plate is stationary in the oil pan beneath the screen at some distance above the bottom of the pan, and in another form it is attached to the float beneath the screen and rises and falls with the latter. In both forms it is shown as a flat disc substantially commensurate in area with the screen. Another object of the present invention has been to provide an improved oil flow control or baffle of this character that will enable the oil entrance or mouth of the float to be located but slightly below the top surface of the oil and at the same time enable the control plate to function as one member of the by-pass valve, that will better control the buoyancy of the float when used with oil at widely varying temperatures and densities, will better prevent vertical lift or suction on the oil body and so avoid disturbing the foreign elements or contamination at the bottom of the pan, and will facilitate the automatic cleaning of the inner side of the plate by backwash of oil from the pump when the motor is shut off.

Another object is to simplify and cheapen the structure of the device shown in my said patent, and render the screen more easily and readily accessible for cleaning when necessary.

Still other objects and attendant advantages of the invention will be apparent to persons skilled in the art as the same becomes better understood by reference to the following detailed description and to the accompanying drawings, in which I have illustrated one approved embodiment of the principle of the invention, and wherein—

Fig. 1 is a longitudinal section in elevation through an engine base to which the invention is applied.

Fig. 2 is an enlarged cross-section on the line 2—2 of Fig. 1, showing the float in relatively high and low positions.

Fig. 3 is a side elevation, in vertical axial section through the float and a portion of the pump intake pipe, showing the by-pass in normal closed position.

Fig. 4 is a view similar to Fig. 3, but showing the screen clogged and the by-pass in open position.

Fig. 5 is a detail view of the hinge of the pump intake pipe, in section on the line 5—5 of Fig. 3.

Fig. 6 is a bottom plan view of the assembly.

Fig. 7 is a bottom plan view of the float with the screen and control plate partly broken away, and Fig. 8 is a perspective view of the concavo-convex wire screen.

Referring to the drawings, 10 designates a typical crank case of a multiple cylinder internal combustion engine within which is mounted the usual crank shaft 11 having bearings 12 and an oil pan 13 suitably connected with and forming the bottom portion of the crank case. 14 designates an oil circulation pump suitably mounted in the engine base which may be operated by the upright shaft 15, the latter being driven by the gears 16 and 17 carried, respectively, by said shaft and the engine cam shaft 18.

The oil pan 13 contains the usual pool of lubricant 19 adapted to be circulated to the shaft bearings 12 through the pump delivery pipes 20. The oil pump 14 may be of any suitable type, but as illustrated it is a gear pump of a well-known design. Attached to the bottom of the pump 14 is a casting comprising a plate 21 and a depending elbow pipe section 22. Within the horizontal section of the pipe 22 is swivelled one end of a curved intake pipe 23 (Fig. 5). The outer end of the fixed pipe section 22 is enlarged and countersunk to receive a collar 24 fast on the pipe 23. This collar 24 is formed with a peripheral groove 25 that registers with a transverse tangential hole 26 formed in the large portion of the pipe 22, and through said hole and groove extends a cotter pin 27, by which the swivelled pipe 23 is locked against displacement from its bearing in the pipe 22, but with freedom of swivelling movement. Integral with the enlarged portion of the pipe 22 is a laterally extending stop member 28 that cooperates with a pair of spaced stop fingers 29 to limit the swinging movements of the intake pipe 23, which latter constitutes the arm of a float, next to be described.

The float, designated as an entirety by F and best shown as to structural details in Figs. 3, 4 and 7, is a hollow sheet metal member comprising a top wall 30, an integral circumferential wall 31 terminating at its lower edge in an external hollow bead 32, and a bottom wall 33, the periphery of which is mounted in the bead 32. This bottom wall 33 is concavo-convex and on its lower surface are formed radial alternating long and short ribs 34 and 35, respectively, the purpose of which is later disclosed. The sector-shaped spaces between adjacent ribs 34 communicate at their inner ends with a circular channel 36 that surrounds a central hole 37 in which the outer end of the intake pipe 23 is soldered, as clearly shown in Figs. 3 and 4, said pipe extending into the float through an opening 38 in the circumferential wall 31. By reason of this construction, the float body is rigidly mounted on the outer end portion of the oil intake pipe or arm 23.

Overlying the outer surface of the bottom plate 33 of the float is a screen 39 shown in isolated detail in Fig. 8. This screen is made of spring wire and is of a concavo-convex form, and its peripheral portion is secured in the bead 32 against the peripheral portion of the bottom wall 33 by clamping the bead 32 on said parts. In the center of the screen is a hole 40, the edge of which is bound by a sheet metal bezel ring 41 clamped thereon. This bezel ring 41 forms one member of an oil by-pass valve that is normally idle but functions when the screen 39 becomes so badly clogged with foreign matter in the oil that it will not pass an adequate amount of oil to the pump, as hereinafter more fully described.

Underlying the screen 39 is an oil flow control member comprising a saucer-shaped plate designated as an entirety by 42. More specifically this member comprises an approximately flat bottom portion 43 and an upwardly and outwardly inclined rim portion 44, integral with which latter are spaced radial tongues 45 that are bent over and clamped on the bead 32 to lock the control plate in fixed position on the bottom of the float. By reference to Fig. 6, it will be observed that for the most part the flow control plate 42 is of slightly less diameter than the screen 39, so that between the edge of the plate and the screen there is formed a mouth for the substantially horizontal inflow of oil from the pool to and through the screen. If desired, this mouth may extend entirely around the screen but preferably, and as best shown in Fig. 6, the inclined rim portion 44 of the plate is extended through an arc of about 90 degrees in contact with the bottom edge of the bead 32, forming practically an oil-tight joint so that the inflow mouth of the float is limited to approximately 270 degrees. It will also be observed by reference to Figs. 2, 3 and 6, that the bottom wall 43 of the control plate is not entirely flat, but is slightly bent on a line 46 facing the closed off portion of the inflow mouth to form a segment 47 that is slightly inclined toward the overlying portion of the screen 39.

As shown in Fig. 3, under the normal spring of the screen the bezel ring 41 lies in contact with the control plate 43, so that the oil entering through the mouth of the float flows through the screen and is guided by the radial ribs 34 and 35 into the central annular groove 36, whence is flows through the intake pipe 23 into the pump. At this time, the central portion of the plate 43, which forms the other member of the by-pass valve, cooperates with the ring 41 to maintain the by-pass closed, and compel all of the oil to flow through the screen.

Unless the screen is frequently cleaned it will in time become so badly clogged with foreign matter that the flow of oil therethrough is greatly reduced and may be entirely cut off, creating a condition which would starve the pump and injure the bearings. If and when this occurs, however, the suction pull on the screen will draw the ring 41 upwardly out of contact with the underlying control plate 43 and thus allow ample oil to flow through the ring, as illustrated by the arrows in Fig. 4, thus automatically making impossible the injury to the bearings through failure of proper lubrication, until the screen can be cleaned or replaced by a new screen. In producing this action it will be observed that the inherent elasticity of the screen is important, since it automatically closes the by-pass and maintains it closed when the latter is not needed.

In Fig. 2 I have illustrated the approximate positions of the float when the oil level in the pan is high and low respectively; the upper level being indicated by the line L and the lower level by the line L'. The upper position of the float is indicated by full lines and the lower position by dotted lines. In both positions and all intermediate positions the inflow orifice or mouth of the float lies approximately three-eighths of an inch below the top level of the oil body, so that the pump on its suction stroke always draws oil and, since the inflow to the float is laterally of the latter, two important advantages result therefrom. In the first place, the float skims off only the cream of the oil, and in the second place, it avoids direct upward or vertical suction on the body of oil, thereby preventing such a churning of the oil as would bring the foreign matter or sediment at the bottom to the top. As compared, for example, with the flat control plate disclosed in my former Patent 1,890,984, the saucer-shaped control plate of the present invention enables the intake mouth of the float to be raised closer to the top of the oil body where the cleanest oil is found. The occlusion of approximately one-fourth of the intake mouth of the float, and the upward inclination of the section of the control plate at the heel of the float prevent vertical lift or suction on the oil body, thus eliminating disturbance of the foreign elements or contamination at the bottom of the pan. They also increase the effective buoyancy at lower oil levels, when the float is in extremely low position and the pan contains only a small quantity of oil. Again, when the engine is shut off and the oil rushes back from the pump, creating a back-wash, the inclined portion of the bottom of the control plate has a very definite effect in washing or cleaning any sediment that has collected on the inside of the plate proper.

The peripheral flange 44 of the control plate, which gives the latter its general saucer shape, raises the peripheral oil inflow opening, as compared with a flat control plate, to such an extent that only the top or "cream" of the oil, which is the cleanest part, is drawn in by the pump, and at the same time the oil passes through the entire area of the screen.

The peripheral flange 44 of the control plate, the upper edge of which is actually higher than the mouth of the suction pipe, as shown in Figs. 3 and 4, insures a substantially horizontal pull of the oil over the top edge of the control plate, and this also contributes to the selection of only the cleanest part of the oil for transmission to the bearings to be lubricated; whereas when a flat control plate is used with a downwardly convex screen, the pump suction at the periphery of the plate approaches a vertical direction, and this stirs up sediment on the bottom of the oil pan as the oil level lowers and the float nears the bottom of the pan.

The buoyancy of the float is increased and its degree of submergence is rendered uniform in oil varying in temperature from below zero to 200° F., as compared with a flat control plate. One reason for the greater buoyancy lies in the fact that when the car is in motion the oil in the crank case is not quiescent, but is swashing around more or less, and its impact on the inclined rim or flange acts, on the cam principle, to lift the float.

Again, the arcuate extension of the flange that contacts with the bottom of the float body in the region of the heel acts as a barrier or dam to check the oil from swashing across the space between the control plate and the screen, especially under acceleration and deceleration of speed—a condition which works against the pump section. And since in the normal upwardly tilted position of the float with a full pan of oil the heel of the float is nearest the bottom of the pan, where the oil is dirtiest, the arcuate portion of the flange extended into contact with the lower edge of the float body forms an effective barrier to the flow of this dirtiest oil to the pump.

And where, as is common, the portion of the bottom wall of the oil pan that is contacted by the control plate in the lowest position of the latter is inclined the chamfered portion 47 of the control plate allows the float to sink lower and function with a less volume of oil than it otherwise could.

From the above it will be observed that the specific form of the control plate herein shown and described, which has been adopted after numerous rigid tests, plays an important part in the efficient function of the device in all phases of its operation requirements.

While I have herein presented one efficient and preferred embodiment of the principle of the invention, it is to be understood that the latter is not limited to the specific details shown and described but may be variously modified, especially to suit differing installations, within the spirit and scope of the appended claims.

I claim:

1. In a lubricating device of the character described, the combination with an oil container, the intake pipe of an oil pump mounted to have rising and falling movement in said container, and a float mounted on said intake pipe and having an opening through a wall thereof communicating with said intake pipe, of a screen mounted on said float through which oil normally flows to said opening, and normally closed means for automatically by-passing oil to said opening in the event that the screen becomes clogged, said last named means being opened by a flexing movement of the clogged screen under the suction of the oil pump thereon.

2. In a lubricating device of the character described, the combination with an oil container, the intake pipe of an oil pump pivotally mounted to swing up and down in said container, and a float mounted on said intake pipe and having an opening through its bottom wall communicating with said intake pipe, of a flexible screen mounted on said float beneath and normally spaced from said bottom wall through which oil normally flows to said opening, said screen having a by-pass opening, and means normally closing said by-pass opening; said by-pass opening being uncovered by a flexing movement of said screen toward said bottom wall under the suction of the pump when the screen becomes clogged.

3. In a lubricating device of the character described, the combination with an oil container, the intake pipe of an oil pump pivotally mounted to swing up and down in said container, and a float mounted on said intake pipe and having an opening through its bottom wall communicating with said intake pipe, of a flexible concavo-convex screen mounted on said float beneath and normally spaced from said bottom wall through which oil normally flows to said opening, said screen having a central by-pass opening, and a member carried by said float normally closing said by-pass openings; said by-pass opening being uncovered by a flexing movement of said screen toward said bottom wall under the suction of the pump when the screen becomes clogged.

4. In a lubricating device of the character described, the combination with an oil container, the intake pipe of an oil pump pivotally mounted to swing up and down in said container, and a float mounted on said intake pipe and having an opening through its bottom wall communicating with said intake pipe, of a concavo-convex spring wire screen secured at its periphery to said float beneath and normally spaced from said bottom wall through which oil normally flows to said opening, said screen having a central by-pass opening, and an oil flow control plate attached at intervals along its periphery to said float beneath said screen and normally covering said by-pass opening; said screen being flexed upwardly to uncover said by-pass opening by the suction of the pump when said screen becomes clogged.

5. In a lubricating device of the character described, the combination with an oil container, the intake pipe of an oil pump pivotally mounted to swing up and down in said container, and a float mounted on said intake pipe and having an opening through its bottom wall communicating with said intake pipe, of a concavo-convex spring wire screen secured at its periphery to said float beneath and normally spaced from said bottom wall through which oil normally flows to said opening, said screen having a central by-pass opening, a ring attached to said screen and bounding said by-pass opening, and an oil flow control plate attached at intervals along its periphery to said float beneath said screen and normally in contact with said ring and covering said by-pass opening; said screen being flexed upwardly to uncover said by-pass opening by the suction of the pump when said screen becomes clogged.

6. In a lubricating device of the character described, the combination with an oil container, the intake pipe of an oil pump mounted to have rising and falling movement in said container, and a float mounted on said intake pipe and having an opening through its bottom wall communicating with said intake pipe, of a screen covering said bottom wall, and an oil flow control member mounted on said float and underlying said screen, said member formed with a bottom wall of less area than said screen and an upwardly and outwardly inclined peripheral flange forming with the lower edge of said float a mouth for a substantially horizontal inflow of oil to said screen over the upper edge of said flange, an arcuate section of said flange of approximately ninety degrees at the heel of the float being extended into contact with the lower edge of the float to restrict the arcuate extent of said mouth to approximately two hundred and seventy degrees.

EDWARD J. GULICK.